United States Patent [19]

Fox

[11] Patent Number: 4,878,511
[45] Date of Patent: Nov. 7, 1989

[54] VALVE ASSEMBLY FOR A VEHICULAR FUEL TANK

[75] Inventor: Clarence D. Fox, Decatur, Ill.

[73] Assignee: Borg-Warner Automotive, Inc., Troy, Mich.

[21] Appl. No.: 919,738

[22] Filed: Oct. 16, 1986

[51] Int. Cl.[4] ............................................. F16K 17/36
[52] U.S. Cl. ........................................ 137/38; 137/43
[58] Field of Search .............................. 137/38, 39, 43

[56] References Cited

U.S. PATENT DOCUMENTS

| | | | |
|---|---|---|---|
| 2,324,464 | 7/1943 | Parker | 137/38 |
| 2,934,077 | 4/1960 | Whiting | 137/38 |
| 4,252,140 | 2/1981 | Hildebrandt | 137/38 |

FOREIGN PATENT DOCUMENTS 2419350 11/1974 Fed. Rep. of Germany ........ 137/38

Primary Examiner—Robert G. Nilson
Attorney, Agent, or Firm—Robert L. Zieg; James J. Jennings; James A. Geppert

[57] ABSTRACT

A gravity responsive regulation valve assembly having a housing with at least two intake ports both of which may fluidically communicate with an outlet port. The valve assembly further includes a spherical valve actuator moveable along a predetermined path of travel in response to gravitational and/or centrifugal forces for automatically closing one of the valve assembly intake ports when the housing is tilted.

19 Claims, 1 Drawing Sheet

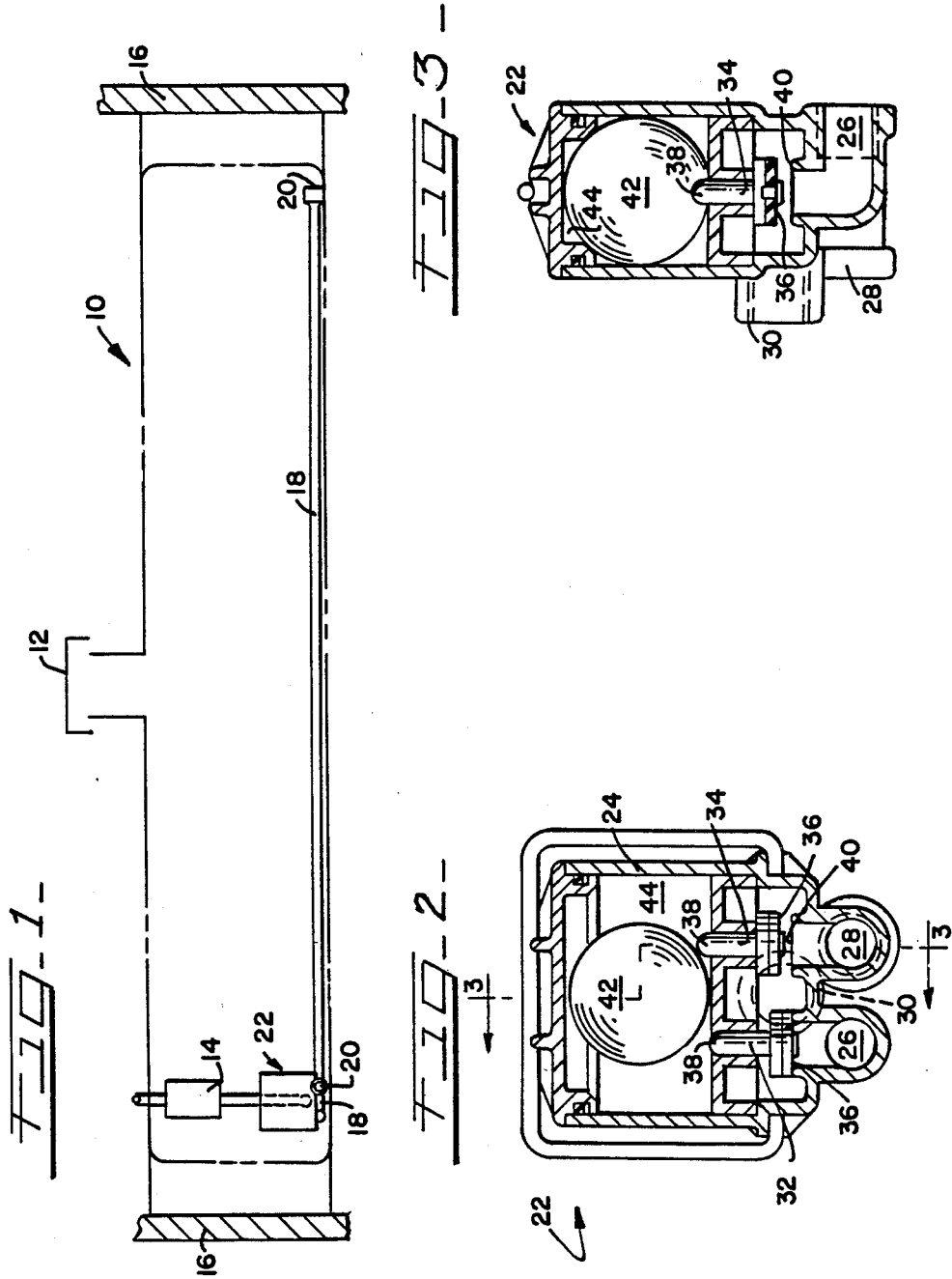

VALVE ASSEMBLY FOR A VEHICULAR FUEL TANK

FIELD OF THE INVENTION

This invention relates to a valve assembly to be used in combination with a tiltable fuel tank or container arranged on a vehicle.

BACKGROUND OF THE INVENTION

The fuel tank of a vehicle is normally fixed to the frame or structure of the vehicle such that it maintains a generally horizontal position. During vehicle operation fuel may flow under gravitational or centrifugal action from one side of the tank to the other. Moreover, as the vehicle is operated, pressure builds in the tank.

A significant problem exists when a single fuel induction pipe or conduit is used to draw fuel from the tank. With a single fuel induction pipe or conduit it sometimes happens that, because of fluid flow, the open end of the induction pipe becomes uncovered and the fuel pump will receive air from the induction pipe and deliver same to the engine. Even when two induction pipes are used to draw fuel, there remains the problem that the open end of either pipe may draw air into the system if such open ends are not continually submersed in fluid.

Several devices have been proposed for airplane fuel tanks which encounter similar problems. None of these devices, however, use substantially the entire weight of a gravity actuated means for controlling fluid flow from a fuel tank.

BRIEF DESCRIPTION OF THE INVENTION

In view of the above, and in accordance with the present invention, there is provided a fuel pump supply valve, for vehicles and the like which solves the heretoforknown problems in a unique manner. The valve of the present invention includes a housing which is carried by the fuel tank or container. The housing is provided with two inlet ports which fluidically communicate with an outlet port. Each inlet port of the valve is adapted for communication with an individual open ended conduit. Each conduit leads to one side or the other of the tank. The output port is adapted for communication with a fuel pump. Arranged for reciprocal movement in the housing are at least two valve members. One valve member being disposed intermediate each inlet opening and the outlet opening. Each valve member is operable between open and closed positions for controlling flow between the openings. A weighted spherical valve actuator which responds to gravitational and/or centrifugal forces is arranged to freely roll in said housing along a predetermined path. The relationship of the valve actuator and each valve being such that substantially the entire weight of the actuator may be imposed on either of said valve members to urge either valve member toward its closed position. Because the actuator rolls in response to gravitational and/or centrifugal forces, the actuator operatively closes that inlet port which is likely to be exposed to air should the level of liquid in the container not sufficiently submerse the open end of the inlet conduit.

In view of the above, a primary object of this invention is the provision of a fuel tank supply valve which will improve the efficiency of a vehicle fuel pump by preventing the induction of air into the fuel supply system.

Another object of this invention is to provide an automatic valve for a fuel tank which will position itself to allow fluid withdrawal from the lowermost point of the tank.

A further object of this invention is the provision of a unitary valve assembly which may be connected to a plurality of fuel withdrawal conduits in a fuel tank and which is adapted to automatically select to draw fuel from that conduit which is submersed in fluid.

Another object of this invention is to provide a simple and economical type of gravity actuated regulation valve for vehicle fuel tank which ensures a continuous supply of liquid without air or mixture of air and liquid in any tilted position of the tank.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which:

FIG. 1 is a schematic illustration of a fuel tank incorporating the present invention;

FIG. 2 is a cross sectional view of the present invention; and

FIG. 3 is a sectional view taken along line 3—3 of FIG. 2.

DETAILED DESCRIPTION OF THE PRESENT INVENTION

Referring now to the drawings, wherein like reference numerals indicate like parts throughout the several views, in FIG. 1 there is schematically illustrated a container or fuel tank 10 having a filling cap 12 and a fuel pump 14 for withdrawing fluid from the container or tank. The fuel tank 10 is positioned on the frame of a vehicle 16 such that it is substantially horizontal. Fuel is supplied to the fuel pump 14 through individual inlet conduits or induction passages 18 having open ends 20 spaced in the container. In the illustrated example, the open ends 20 of the conduits 18 are widely spaced so that when the tank or container is tilted and the fuel moves to one side or the other, one of the open ends will be submersed in liquid which flows by gravity or centrifugal action to the lowest point of the tank.

Disposed intermediate the open ends 20 of the conduits 18 and the fuel pump 14 is the valve assembly 22 of the present invention. The valve assembly is shown in FIG. 1 as being rigidly secured to the container or tank 10 so that it will tilt therewith. As best illustrated in FIGS. 2 and 3, the selector valve assembly 22 includes a housing 24 adapted for connection to the tank and having inlet ports 26 and 28 and an outlet port 30. Each of the inlet ports are adapted for connection with one of the conduits 18 and are arranged in the fluid communication with the outlet port 30. The outlet port is adapted for communication with the fuel pump 14.

Interposed between each inlet port 26 and 28 and the outlet port 30 are laterally spaced apart valve members 32 and 34. Each valve member is reciprocally arranged for movement in the housing 24 along a generally vertical path of travel between an open position and a closed position. Each valve member includes a seal face portion 36 and an upstruck stem portion 38. Each valve member with its seal face portion is adapted to move toward and away from individual valve seats 40 provided for each inlet port and defined by said housing 24. As may be readily understood, the valve members 32 and 34 are maintained in their open position under the influence of suction or negative pressure created by fuel pump operation. When the seal face portion 36 of each valve is raised from the valve seat 40, fluid is permitted to freely flow from the inlet port to the outlet port and thence to the fuel pump. On the other hand, should the seal face portion 36 be in contact with the valve seat 40, fluid is retarded from reaching the outlet port of the housing through the closed valve member.

A weighted spherical valve actuator 42 is provided for automatically closing one or the other of said valve members as a function of fuel tank disposition. As best illustrated in FIGS. 2 and 3, in the presently preferred form, the valve actuator 42 is a ball which is arranged to role in a cavity 44 provided in the housing 24. The cavity 44 acts to guide the valve actuator or ball along a predetermined path. The ball is free to move back and forth in the housing and will roll easily on guiding faces defined by the walls of the cavity 44. The predetermined path of travel for the valve actuator extends above the valve stem portion 38 of each valve member and substantially perpendicular to its reciprocal path of movement. By such construction, substantially the entire weight of the actuator is imposed on either of the valve members as the actuator rolls into contact and over the valve stem portion of the valve member. As best illustrated in FIG. 2, the valves 32 and 34 are laterally spaced apart a sufficient distance such that the valve actuator 42 may impose a closing force on only one valve at a time. It should be noted that the weight of the ball or valve actuator is sufficient to impose a closing force on the valve member which is greater than the opening force created by the negative pressure or suction of the fuel pump.

In the operation of the outlet selector valve assembly, liquid or fuel will normally cover the open or inlet ends 20 of conduits 18 when the tank or container 10 is level. As such, fuel may enter the housing 24 through either or both inlet ports 26 and 28, passing through the uncovered or open valve seat to the outlet port 30. The liquid will then pass to the fuel pump 14 and, ultimately, from the tank 10.

When the tank tilts as a result of vehicle turning or manuevering, fuel collects in the lowermost point of the tank and one of the open or inlet ends of the conduit may be exposed to air. The relationship between the valve actuator and the valves is such that the actuator automatically closes that intake port that is open or exposed to air. Since housing 24 tilts simultaneously with the container or tank, it is obvious that the valve actuator will roll under the action of gravity and/or centrifugal force, and will selectively impose a closing force on the valve member associated with the inlet port which is open to the air. Because the ball or valve actuator moves along a path above the valve stem portion, substantially the entire weight of the actuator urges the valve closed to prevent the induction of air through the exposed conduit. That is, the outlet port 30 is sealed from the inlet port exposed to air and is open to the other inlet port. When the vehicle resumes its level position, the valve actuator releases the closing force on the valve member such that it again opens to fuel passage.

As may be readily understood, with only slight variations it is conceivable that the valve arrangment of the present invention may be used in applications other than that described. One such alternative involves the use of the valve arrangment as a means for venting the fuel tank. In such an application, the open ends 20 of the conduits 18 and the valve housing 24 would be arranged in the upper portion of the tank 10 to exhaust fuel vapors from the tank. That conduit whose end may be exposed to the pressure in the tank will communicate same to the housing 24 whereby opening the associated valve member and passing such vapor from the tank. Because the valve assembly of the present invention can be connected to a plurality of conduits only one valve assembly which responds to gravitational and/or centrifugal action would be required for each fuel tank.

Thus, there has been provided a VALVE ASSEMBLY FOR A VEHICULAR FUEL TANK which fully satisfies the objects, aims and advantages setforth above. While the invention has been described in connection with specific embodiments thereof, it is evident that other alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. An outlet selector means for a vehicle fuel tank which tilts as a function of the vehicle's inclination, said selector means comprising:
   a housing connected to and tiltable with said fuel tank and having two intake openings which are in fluid communication with an outlet opening;
   valve means disposed between said outlet opening and each of said intake openings for controlling fluid flow between said openings, each valve means beings movable between open and closed positions; and
   gravity actuated means for closing either of said valve means as a function of fuel tank disposition, said gravity actuated means being arranged to roll in said housing along a predetermined path of travel which allows substantially the entire weight of said gravity actuated means to urge either of said valve means toward its closed position.

2. The outlet selection means of claim 1 wherein said valve means are spaced apart in said housing such that said gravity actuated means imposes a closing force on only one of said valve means.

3. The invention according to claim 1 wherein said housing includes a cavity which defines the predetermined path of travel for said gravity actuated means.

4. The invention according to claim 3 wherein each of said valve means includes an upstruck stem portion which extends into said cavity and which is contacted by said gravity actuated means.

5. The invention according to claim 4 wherein said path of travel extends substantially perpendicular to the upstruck stem portion of each valve.

6. An outlet selector valve for use with an automobile fuel tank, said selector valve comprising:
   a housing connected to said fuel tank and having two inlet openings both of which are arranged in fluid communication with an outlet opening, each of said inlet openings having a valve seat defined by said housing;

at least two valves reciprocally arranged in said housing for movement along a generally vertical path and into contact with the respective valve seats, one valve being disposed between each valve seat and said outlet opening and including a stem portion which, when the the valve is removed from the valve seat, upwardly extends into a cavity provided in said housing; and a spherical valve actuator arranged to roll in said cavity into contact with said upwardly extending stem portions in response to gravitational forces, said actuator imposing a generally a downwardly directed force on one of said contacted stem portion whereby urging the associated valve into contact with its seat to close the associated inlet opening from said outlet opening when the housing tilts in one direction.

7. The outlet selector valve of claim 6 wherein said valve actuator imposes a generally downward directed force on the other contacted stem portion whereby urging the associated valve into contact with its seat to close the associated inlet opening from said outlet opening when the housing tilts in an opposite direction.

8. The outlet selector valve of claim 6 wherein said cavity guides said spherical valve actuator along a predetermined path.

9. The outlet selector valve of claim 8 wherein said predetermined path extends above said valve seats and substantailly perpendicular to the reciprocal path of movement traversed by said valves.

10. An apparatus for controlling fluid withdrawal from a container comprising:
   a housing adapted to be carried by said container and having two intake ports both of which may fluidically communicate with an outlet port;
   a weighted spherical valve actuator arranged to roll in said housing along a predetermined path in response to tilting of the container; and
   a pair of valve members disposed in spaced alignment beneath said predetermined path in said housing for reciprocal movement between first and second positions, one valve member being disposed between each inlet port and said outlet port such that substantially the entire weight of said valve actuator is imposed on either one of said valve members automatically when said container is tilted whereby causing said one of said valve members to move from one position to another.

11. The invention according to claim 10 wherein said first position of said valve member permits fluid flow from its associated intake port to said outlet port.

12. The invention according to claim 10 wherein said second position of said valve member inhibits fluid flow from its associated intake port to said outlet port.

13. The invention according to claim 10 wherein the weight of said actuator urges said one of said valve members from its first position toward its second position.

14. The invention according to claim 10 further comprising individual inlet conduits leading to each intake port in said housing from open ends spaced in the container wherein at least one of the open ends will be submersed in liquid in any position of the container.

15. A valve for dispensing fuel from a vehical fuel tank having a fuel pump comprising:
   a housing carried by the fuel tank and having at least two intake ports both of which are arranged in fluid communication with an outlet port, said outlet port being adapted to communicate with said fuel pump;
   a pair of valve members arranged in spaced relation and operable between open and closed positions, with one valve member being disposed between each intake port and said outlet port to permit free flow of fuel from the intake port to the outlet port when the vehicle maintains a substantially level condition; and
   spherical valve actuator means disposed to move in said housing along a perdetermined path in response to gravitational forces and arranged such that said spherical valve actuator means imposes a closing force on only one valve member at a time when the housing is tilted whereby insuring that there is always at least one intake port remaining open to the outlet port.

16. The valve according to claim 15 wherein the valve members are disposed in spaced alignment beneath said predetermined path of said actuator means.

17. The valve according to claim 15 wherein said housing defines a cavity in which said actuator means moves.

18. The invention according to claim 17 wherein said cavity defines the predetermined path for said actuator means.

19. The invention according to claim 15 wherein said spherical valve actuator means is designed to impart a closing force to either of said valve members which is greater than an opening force imparted to said valve members by a suction created by said fuel pump.

* * * * *